Patented Oct. 23, 1928.

1,688,720

UNITED STATES PATENT OFFICE.

AUGUST KLAGES, OF MAGDEBURG-SUDOST, GERMANY.

TREATMENT OF SEED.

No Drawing. Application filed May 17, 1926, Serial No. 109,574, and in Germany October 27, 1923.

In a co-pending application filed at the same date herewith under Serial No. 109,573 I have described improvements in treating seeds in order to destroy animal or vegetable pests or noxious agents, such as bacteria and the like, the seeds being treated with the salts of complex mercury compounds of cyclic (aromatic or heterocyclic) bases.

Now, according to the invention forming the subject matter of the present application, instead of the said salts of complex mercury compounds, mixtures of salts are applied to the seeds, which mixtures by interaction with water produce the said salts of complex mercury compounds.

The introduction of mercury into the salts of aromatic bases and the formation of easily soluble products occurs remarkably quickly in the presence of an alkali metal chloride or an alkaline earth metal chloride, so that it is possible to use instead of the complex mercury compounds of the bases, mixtures of mercury salts, alkali metal or alkaline earth metal chlorides and the hydrochlorides of the bases, in which case introduction of the mixture into water produces easily soluble complex salts of the mercury bases.

Indifferent salts may be added to the mixtures of salts in order to regulate the mercury percentage contained therein, or the quantity of the said chlorides may be such that the desired percentage of mercury is present. If desired, colouring matters or dyestuffs may be added.

The following is an example of the preparation of a composition of matter suitable for carrying out my invention, the parts being indicated by weight.

2.5 parts of aniline hydrochloride, 5 parts of mercuric chloride and 2,5 parts of potassium chloride are finely ground together in a ball mill, and the mixture is made up to a desired mercury content by addition of sodium sulphate and a dyestuff.

The above illustration is merely one example of how my invention can be carried into practice, and is not to be considered as limiting the invention to the specific ingredients mentioned.

The invention is applicable as well to mixtures of certain other salts of cyclic bases and mercury. For example, mixtures of pyridine hydrochloride and mercuric chloride, piperidine hydrochloride and mercuric chloride, and dimethylaniline hydrochloride and mercuric chloride may be used, and it will be understood, therefore, that this invention contemplates the use of mixtures of salts of cyclic bases with various mercury salts, such as mercuric chloride, which mixtures are known to be capable of reacting with water to form salts of complex mercury compounds of cyclic bases.

What I claim is:—

1. A composition of matter for the treatment of seed in order to destroy noxious agents such as bacteria and the like, said composition comprising a mixture of a salt of a basic aromatic compound having an amino group directly attached to the ring, mercuric chloride adapted to react with said salt and an inorganic chloride capable of accelerating the reaction.

2. A composition of matter for the treatment of seed in order to destroy noxious agents, such as bacteria and the like, said composition comprising a mixture of aniline hydrochloride, mercuric chloride and an alkali metal chloride.

3. A composition of matter for the treatment of seed in order to destroy noxious agents, such as bacteria and the like, said composition comprising a mixture of aniline hydrochloride, mercuric chloride and potassium chloride.

In testimony whereof I have affixed my signature.

AUGUST KLAGES.